(12) United States Patent
Snyder

(10) Patent No.: US 7,006,980 B1
(45) Date of Patent: Feb. 28, 2006

(54) METHOD AND SYSTEM FOR SELECTING OPTIMAL COMMODITIES BASED UPON BUSINESS PROFILE AND PREFERENCES

(75) Inventor: Scott Andrew Snyder, Berwyn, PA (US)

(73) Assignee: CallVision, Inc., Seattle, WA (US)

( * ) Notice: Subject to any disclaimer, the term of this patent is extended or adjusted under 35 U.S.C. 154(b) by 825 days.

(21) Appl. No.: 09/611,958

(22) Filed: Jul. 6, 2000

Related U.S. Application Data

(63) Continuation-in-part of application No. 09/497,483, filed on Feb. 4, 2000.

(51) Int. Cl.
*G06F 17/60* (2006.01)

(52) U.S. Cl. .......................... 705/10; 706/47; 706/925; 705/36; 705/37

(58) Field of Classification Search .................. 705/36, 705/37, 10; 706/47, 925
See application file for complete search history.

(56) References Cited

U.S. PATENT DOCUMENTS

| | | | |
|---|---|---|---|
| 4,829,426 A | 5/1989 | Burt ........................... 364/300 |
| 5,182,793 A | 1/1993 | Alexander et al. ............ 395/13 |
| 5,483,445 A | 1/1996 | Pickering .................... 364/406 |
| 5,537,314 A | 7/1996 | Kanter ....................... 364/406 |
| 5,583,763 A * | 12/1996 | Atcheson et al. .............. 707/3 |
| 5,655,085 A | 8/1997 | Ryan et al. .................. 364/401 |
| 5,684,965 A | 11/1997 | Pickering .................... 395/234 |
| 5,802,502 A | 9/1998 | Gell et al. ..................... 705/37 |
| 5,862,203 A | 1/1999 | Wulkan et al. ............. 379/114 |
| 5,873,071 A * | 2/1999 | Ferstenberg et al. .......... 705/37 |
| 5,873,072 A | 2/1999 | Kight et al. .................. 705/40 |
| 5,897,621 A | 4/1999 | Boesch et al. ................ 705/26 |
| 5,915,006 A | 6/1999 | Jagadish et al. ............ 379/127 |
| 5,918,217 A * | 6/1999 | Maggioncalda et al. ...... 705/36 |
| 5,943,656 A | 8/1999 | Crooks et al. ................ 705/30 |
| 5,963,910 A | 10/1999 | Ulwick .......................... 705/7 |
| 5,963,939 A | 10/1999 | McCann et al. ............... 707/4 |
| 5,970,130 A | 10/1999 | Katko ........................ 379/201 |
| 5,978,780 A | 11/1999 | Watson ........................ 705/40 |
| 5,987,434 A | 11/1999 | Libman ....................... 705/36 |
| 5,991,310 A | 11/1999 | Katko ........................ 370/522 |
| 5,991,739 A | 11/1999 | Cupps et al. ................. 705/26 |
| 6,012,051 A | 1/2000 | Sammon, Jr. et al. ........ 706/52 |
| 6,035,025 A | 3/2000 | Hanson ...................... 379/144 |
| 6,035,277 A | 3/2000 | Anbil et al. ................... 705/8 |

FOREIGN PATENT DOCUMENTS

JP 411085846 A1 * 3/1999
WO WO 9833104 A2 * 7/1998

OTHER PUBLICATIONS

Freeman "Keeping 'em happy"; 8, 2000; Marketing News v34n10 PP: Doialog file 15, Accession No. 53388340.*

* cited by examiner

*Primary Examiner*—Romain Jeanty
(74) *Attorney, Agent, or Firm*—Darby & Darby P.C.; Jamie L. Wiegand

(57) ABSTRACT

A system and method for assisting a customer in choosing among commodities based on a business profile of the customer that includes asking the customer for a definition of its business; searching a decision rules database and applying decision rules to the business definition; creating a set of business requirement questions based upon the applied decision rules database; answering the set of business requirement questions by the customer; implementing a business rule filter to the answers of the set of business requirement questions; recommending to the customer commodity types based upon the business rule implementation; and optimizing the recommended commodity types to find the best value commodity, which can be a product or service.

23 Claims, 11 Drawing Sheets

Internet survey

1) Compared to an ISP (ISP) that ranked average in a national quality survey (where quality represents content, customer service and reliability), how much more or less would you expect to pay ($/month) for a ISP that:
   - ranked in the top 20% nationally ___
   - ranked 10-30% above average nationally ___
   - ranked 10-30% below average nationally ___
   - ranked in the bottom 20% nationally ___

2) Assuming you currently connect to the Internet by dialing up through your phone line (56K Modem), how much more would you be willing to pay ($/month) for a connection that:
   - downloads content from the web 2 times faster ___
   - downloads content from the web 10 times faster ___
   - downloads content from the web 20 times faster ___
   - downloads content from the web 100 times faster ___

3) How much of this additional premium from 3) would you be willing to pay as a one time up front cost ($ for equipment, installation, activation, etc.) for a connection that:
   - downloads content from the web 2 times faster ___
   - downloads content from the web 10 times faster ___
   - downloads content from the web 20 times faster ___
   - downloads content from the web 100 times faster ___

4) Assuming you currently have one email account through your current ISP, how much more would you be willing to pay ($/month) for:
   - 1 additional EMAIL accounts ___
   - 2 additional EMAIL accounts ___
   - 5 additional EMAIL accounts ___
   - 10 additional EMAIL accounts ___

5) Assuming you currently do not have any personal disk storage space (for file storage and personal web-sites) through your current ISP, how much more would you be willing to pay ($/month) for:
   - 1 Mbyte of disk storage space (store 10 content rich web pages, or a video clip) ___
   - 2 Mbytes of disk storage ___
   - 3 Mbytes of disk storage ___
   - 5 Mbytes of disk storage ___
   - 10 Mbytes of disk storage ___

6) Compared to a ISP that required no time commitment for a contract to provide Internet service, how much less ($/month) would you expect to pay for a plan that requires a:
   - 3 month commitment ___
   - 6 month commitment ___
   - 1 year commitment ___
   - 2 year commitment ___

Figure 8

METHOD AND SYSTEM FOR SELECTING OPTIMAL COMMODITIES BASED UPON BUSINESS PROFILE AND PREFERENCES

This is a continuation-in-part of a copending application Ser. No. 09/497,483 filed on Feb. 4, 2000, which is incorporated herein by reference.

BACKGROUND OF THE INVENTION

1. Field of the Invention

The present invention relates to the sale of commodities, such as products and services, and more particularly, to a system and method for assisting business customers in selecting products and services as well as optimizing the choices for those products and services.

2. Description of the Related Art

In current practice, the average customer has a difficult time sifting through the enormous number of options for commodities, such as products and services, in order to find the best selection. Moreover, the increasing number of vendors that sell similar products and/or services adds to the difficulty. For example, in one state alone, customers may face a choice between hundreds of vendors with thousands of different plans for telecommunication, power, and cable/satellite services.

As an additional complicating factor, many customers, especially business customers, may not really know exactly which products and services they need when starting a business or a new office.

As a result of these numerous options, customers face various challenges. First, customers lack perfect information and are unaware of available choices. Second, customers are barraged with cryptic information from vendors that is difficult to decipher. The perpetual flood of new options that are offered for the purpose of attracting new customers exacerbates this problem. Third, many customers do not make optimum choices of the deals offered by the various vendors because they do not understand the choices in general, the impact the choices may have, and the cost of the choices. Fourth, significant time investment is required for customers to find all of the information they need to compare offerings from different vendors. Usually, it takes more time and effort than the average customer wants to exert.

These problems are compounded in the case of business customers, especially small business and start-up business customers. Business customers generally require a greater number and variety of services than a consumer customer. Additionally, the person responsible for acquiring needed services for a small or start-up business may not know exactly which types of services will be required. For example, a small business customer might move into office space for the first time. This customer may need various types of phone, power, computer, network and Internet services that cover current requirements and any expected future growth. The business will have difficulty selecting which categories of service it requires, as well as selections within each category.

Many vendors rely on conducting their own internal research studies in order to better understand their potential target audience. The marketplace is changing so rapidly that it is difficult for vendors to keep pace. Vendors need to remain current with their customer base and anticipate new services and products based on the changing needs of the customer.

Several systems and methods have been developed over the years to solve the above problems, but these systems and methods have many disadvantages. For example, many merchants or third-party resellers have web sites that offer side-by-side comparisons of products and/or services. One disadvantage of such a web site is that the customers have to spend a significant amount of time determining what is best based on their own subjective assessment of the value associated with the various options. Another disadvantage is that these web sites do not provide any type of assistance in determining the types of products and services that are needed by a business customer, as in the case of a business start-up or customers without the necessary expertise.

Therefore, an integrated system and method are needed to assist customers in selecting the best value option from a set of commodities based on the customers' preferences, to assist vendors in acquiring and retaining customers, and to assist businesses without the required expertise in determining which product and service types they need to purchase.

SUMMARY OF THE INVENTION

Accordingly, the present invention is directed to a system and method that substantially obviate one or more of the problems due to limitations and disadvantages of the related art.

An object of the present invention is to provide a system and method for assisting the customer in finding the optimal set of products and/or services based on the customer's business profile. Customers are asked a series of questions that provide a general profile of their business, and the system and method of the present invention use this information to recommend the necessary commodity types the customer should consider for purchase and to generate the optimal set of commodity options that best meets the needs of the customers. As a result, customers save time and money and find the best products/services that meet their needs.

Additional features and advantages of the invention will be set forth in the description, which follows, and will be apparent from the description, or may be learned by practice of the invention. The objects and other advantages of the invention will be realized and attained by the structure particularly pointed out in the written description and claims hereof as well as the appended drawings.

To achieve these and other advantages in accordance with the purpose of the invention, as embodied and broadly described herein, the present invention provides a method for assisting a customer in choosing among commodities comprising the steps of asking the customer for a definition of its business; searching a decision rules database and applying decision rules to the business definition; creating a set of business requirement questions based upon the applied decision rules database; asking the customer the set of business requirement questions; answering the set of business requirement questions by the customer; implementing a business rule filter to the answers of the set of business requirement questions; and recommending to the customer commodity types based upon the business rule implementation.

In another aspect, the present invention provides a system for assisting a customer in choosing between commodity types, comprising an optimizer device that is connected to a network; a customer device for connecting to the optimizer device via the network and sending business requirement information to the optimizer device, wherein the optimizer device includes at least one database that contains information about at least one commodity type, at least one utility function, and at least one business profile for the customer;

and a processing component for presenting to the customer a list of commodity types containing at least one commodity type based on the business profile for the customer and the utility function for the commodity type.

In another aspect, the present invention provides a system for assisting a customer in choosing among commodities comprising means for asking the customer for a definition of its business; means for searching a decision rules database and applying decision rules to the business definition; means for creating a set of business requirement questions based upon the applied decision rules database; means for answering the set of business requirement questions by the customer; means for implementing a business rule filter to the answers of the set of business requirement questions; and means for recommending to the customer commodity types based upon the business rule implementation.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 8 is a survey for customers of an ISP plan;

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

The present invention provides an integrated system and method to assist a business customer in selecting the types of commodities that the business requires, and then selecting commodities based on the customer's preferences. In particular, the system of the present invention determines the optimal commodity choices for a customer based on values that the customer assigns to key features, attributes, or performance characteristics of the commodities that the customer is shopping for and the relative importance of those features, attributes, or performance characteristics to the customer. As a result, the present invention enables a customer to select the "best value" commodities, rather than just selecting the "lowest cost" commodities.

The system of the present invention builds a profile of a business customer in order to determine the types of commodities that it needs. Using the profile and internal decision rules, the system determines the types of commodities the business customer needs; the input profile to each selected commodity type can be pre-populated based on the business requirements collected from the user. It then optimizes each of these categories and presents the best value options to the customer. The customer may then use the system to purchase any desired commodities.

The system of the present invention is not limited to any particular products or services. The selection of any type of commodity, including but not limited to goods, products, services, and/or service plans, can be optimized by the system of the present invention.

The components of the system will be described now, followed by a description of the operation of the system.

Figure 1:
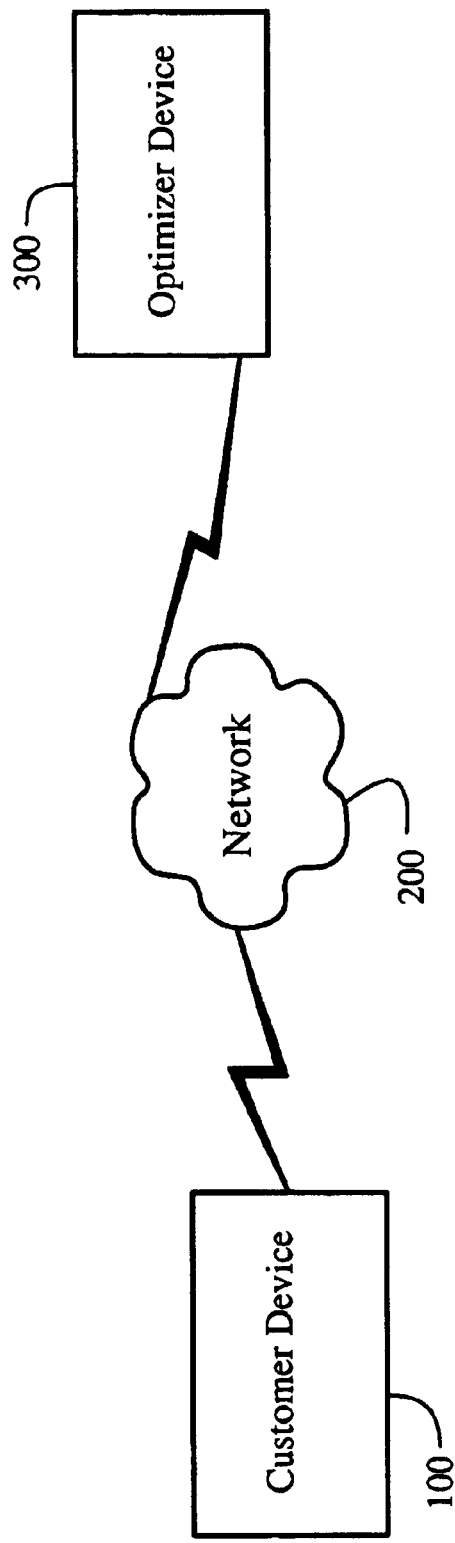
FIG. 1 is an overall system block diagram of a preferred embodiment of the present invention.

With reference to FIG. 1, a preferred embodiment of the system in accordance with the present invention includes an optimizer device 300 that is connected to a network 200. A customer device 100 accesses the optimizer device 300 through the network 200. Network 200 may be any type of computer network, such as the Internet, an Intranet, or an Extranet, for example. Access devices, such as phone lines, cable lines, fiber optic cables, or wireless communication systems may be used to access the network 200. One or more types of access devices may be used to connect to the network 200. For example, the customer device 100 may access the network 200 using a wireless communication system, whereas the optimizer device 300 may access the network 200 using fiber optic cables. This and other networks and access device configurations will be known to those skilled in the art, and are within the scope of this invention. The structure of the customer device 100 and the optimizer device 300 will be described next.

Figure 2:
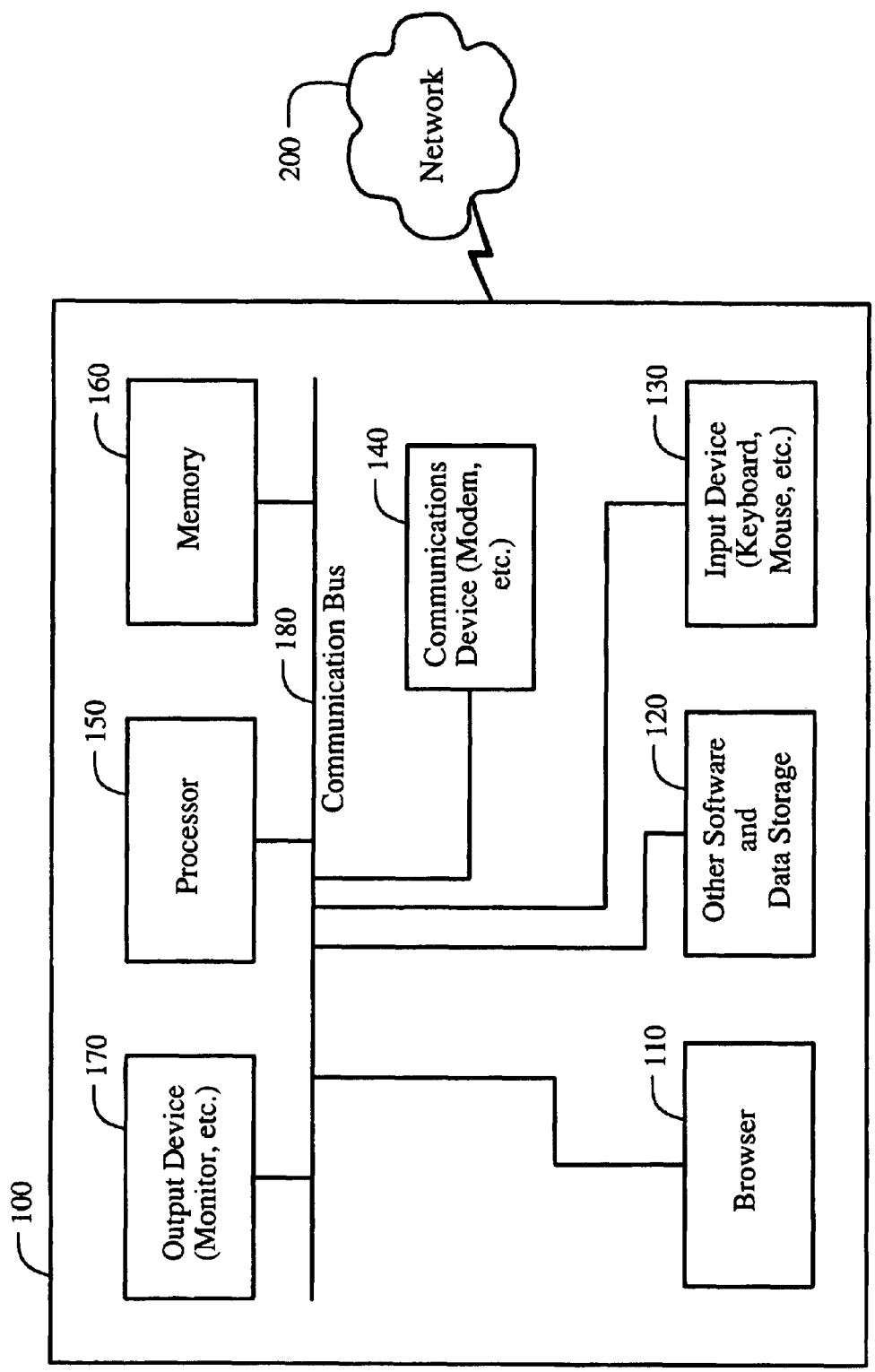
FIG. 2 is a block diagram illustrating the components of the customer device 100 shown in FIG. 1.

Customers in the system of the present invention may include, but are not limited to, consumers, businesses or government entities. The customer device 100 is used by a customer to access the network 200. The customer device 100 may be a personal computer, a handheld computer or any similar device known to those skilled in the art. As shown in FIG. 2, the customer device 100 may include a browser 110, such as a world wide web browser; other software and data storage 120; at least one input device 130, such as a keyboard or a mouse; at least one communications device 140, such as a modem; at least one processor 150; memory 160; and at least one output device 170, such as a monitor; all of which may communicate with each other, for example, via a communication bus 180. The memory 160 may be Random Access Memory (RAM), Read Only Memory (ROM), or both. Other customer devices and their components will be known to those skilled in the art, and are within the scope of the present invention.

Figure 3:
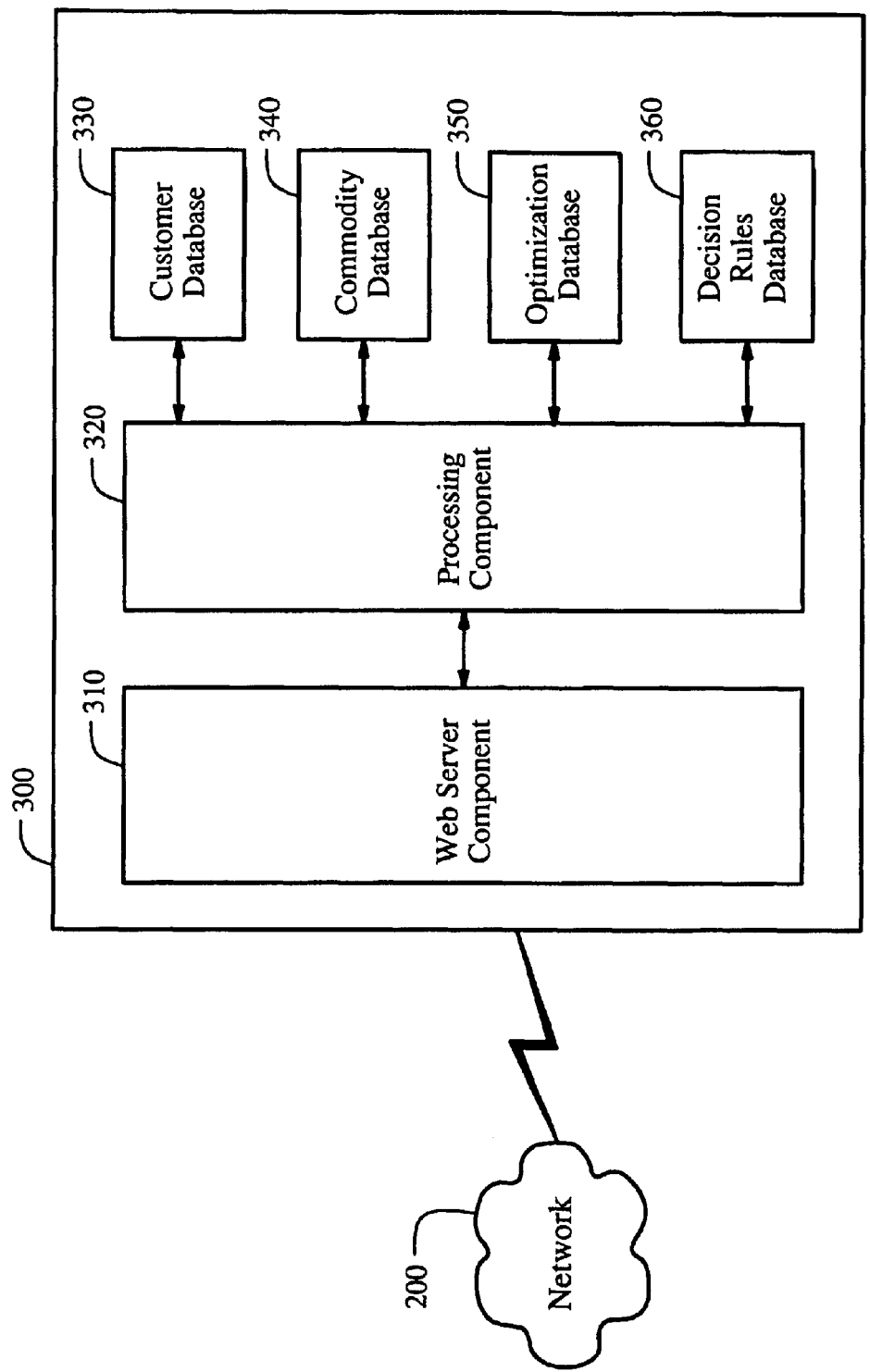
FIG. 3 is a block diagram illustrating the components of the optimizer device 300 shown in FIG. 1.

The optimizer device 300 shown in FIG. 1 will be described now. As shown in FIG. 3, the optimizer device 300 may include a web server component 310, a processing component 320, a customer database 330, a commodity database 340, an optimization database 350, and a decision rules database 360. The optimizer device 300 also may include at least one administrative interface for administering the various components. Other devices and their components will be known to those skilled in the art, and are within the scope of the present invention. Some of the components shown in FIG. 3 will be described in detail along with the description of the system's operation.

Each of the components of the optimizer device 300 will now be described. The web server component 310 may be used to host a web site. The processing component 320 may include optimization and database interaction routines. The web server component 310 and the processing component 320 may be used to obtain information from the customer, such as name and preferences, which is then stored in the customer database 330.

The commodity database 340 stores information on the vendors and commodities. Vendors in the present invention may include, but are not limited to, merchants, service providers, government entities, and non-profit organizations. Vendors may sell or lease the commodities or they may provide these commodities free. The administrative interface may be used to enter information about these vendors and their commodities into the commodity database 340. The vendors and commodities may be indexed in the commodity database 340 by categorizing them into a product or service category. For example, all vendors that sell automobiles may be categorized into a vehicle category. The commodity database 340 may include quality, features, and price information for a commodity. For example, if the commodity category is Internet Service Provider (ISP) plans, the commodity database may include information about ISPs such as the geographic area where an ISP provides service, monthly cost, usage cost per hour, equipment cost, connection speed, disk space, number of email accounts, quality rating, contract length, and termination fee. The quality rating may be a third party rating or a rating based on previously collected samples of customer responses to questions asked on the web site.

The optimization database 350 stores utility functions, constants, supporting statistics, and other optimization equations. The utility function may be an equation for calculating a quantitative value, such as a dollar value, that a customer associates with the key features, attributes, or performance characteristics of a commodity. For example, in the case of an ISP, the optimization database 350 may contain utility functions for calculating the value that the customer associates with connection speed, amount of disk space, quality of the service provider, number of email accounts, service contract length, and termination fee associated with early termination. For telephone services, the optimization database 350 may contain utility functions for calculating the value that the customer assigns to service features, such as call waiting, quality of service, contract length and termination fee. The utility functions are evaluated to obtain values that quantitatively represent a cost or benefit of the key parameters to the customer.

The optimization database 350 also stores other optimization equations, such as estimated cost equations and effective cost equations. Estimated cost equations represent the cost of a commodity to a customer based on the customer's usage characteristics. For example, in the case of an ISP, the estimated cost equation is based on usage of the Internet service and will be explained with the description of the operation of the system. The estimated cost equation may also include other costs or savings, such as online billing costs or savings if the customer requests online billing. Effective cost equations, on the other hand, include the values obtained from evaluating the utility functions, estimated cost equations, and any other costs, such as amortization costs. If the utility function represents a benefit to the customer, then the value is subtracted from the estimated cost. On the other hand, the value is added to the estimated cost if it represents a cost or burden to the customer.

The decision rules database 360 stores the information needed to build a profile of a business customer. The information stored in the decision rules database 360 includes the specific type of business the customer has, the main location of the business and other locations, if applicable. The decision rules database also stores information about the number of employees and the growth rate projected by the customer. Related to the employee factors, the database will store information regarding computer usage, telephone usage, Internet usage, security, and building specifications. The present invention is not limited to the above examples. Other information relating to a business customer and necessary for creating a business profile will be known to those skilled in the art and are within the scope of the present invention.

Figure 4:
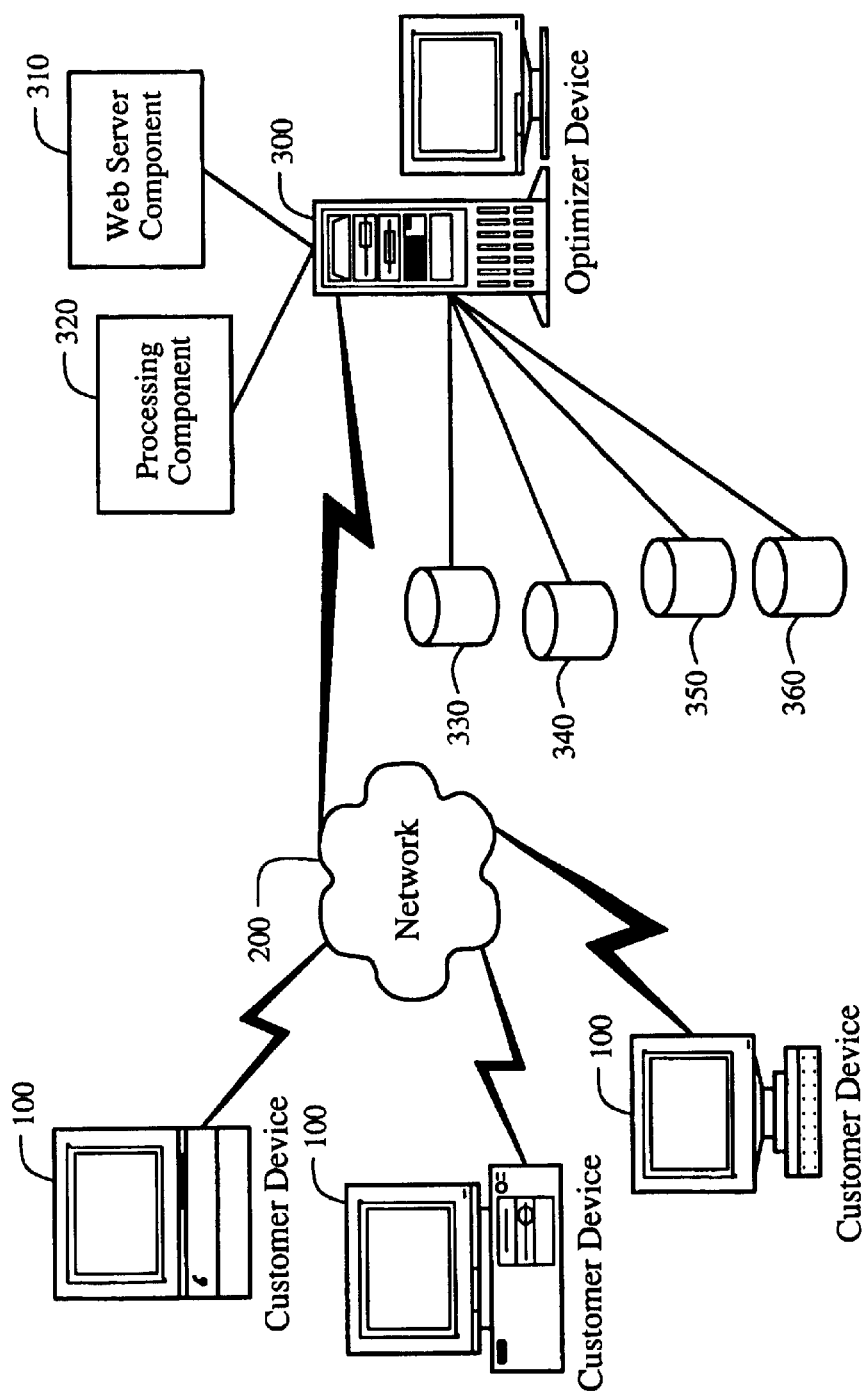
FIG. 4 is a block diagram illustrating an example of a system of the present invention.

Two examples of how the system of the present invention may be implemented will be described now by referring to FIGS. 4 and 5. As shown in FIG. 4, a customer may use a desktop computer or laptop computer as customer device 100. This computer may contain all the components shown in FIG. 2. At the other end, the application server may be used as the optimizer device 300. This server may include the web server component 310, processing component 320, customer database 330, commodity database 340, optimization database 350, and decision rules database 360. Optimizer device 300 and customer device 100 are connected to each other via the Network 200, such as the Internet. The customer may use the communications device 140 in his computer to connect to the Internet and access the web site hosted by the web server component 310 on the server using the browser 110 and standard Internet protocols.

Figure 5:
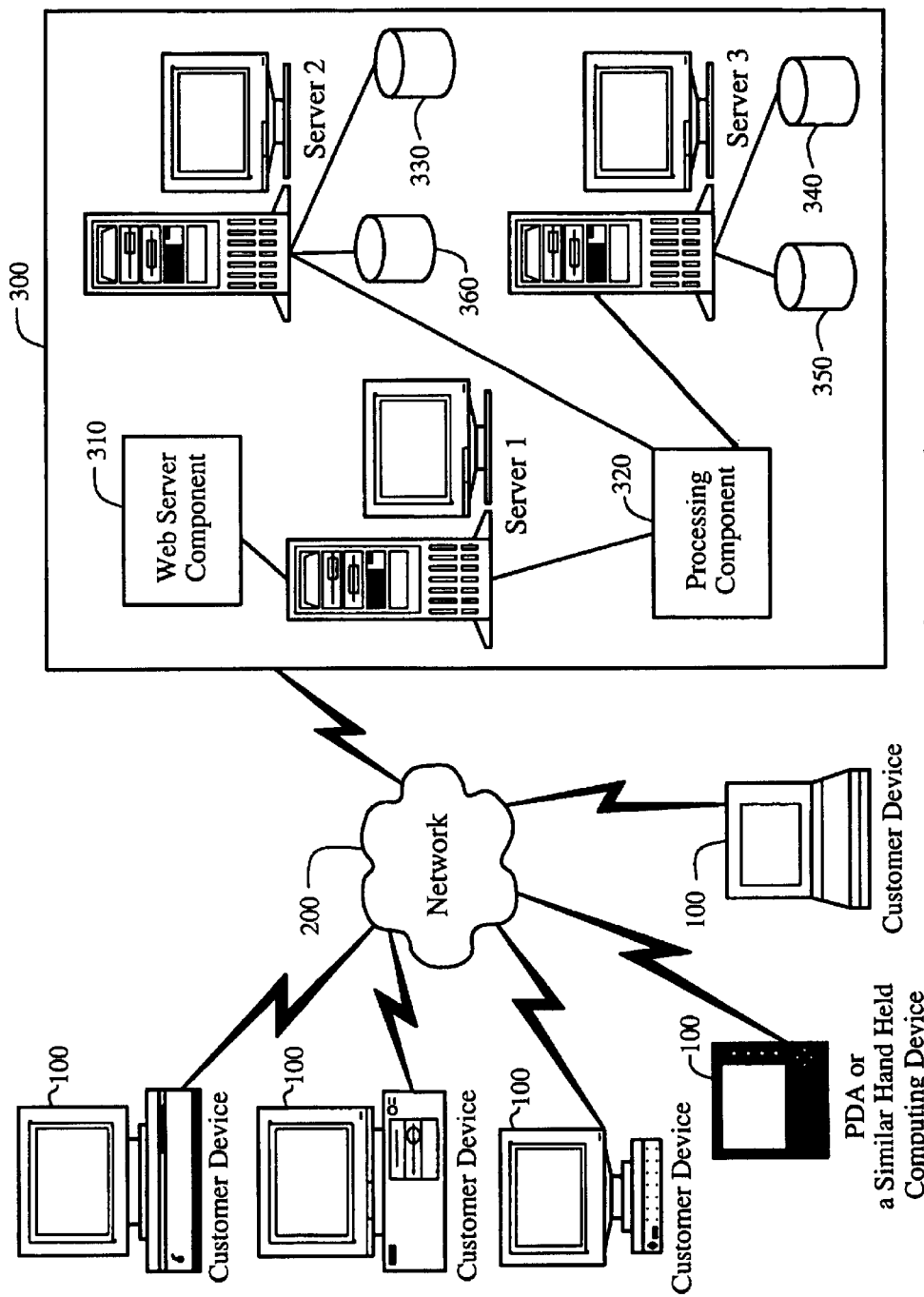
FIG. 5 is a block diagram illustrating a second example of a system of the present invention.

FIG. 5 shows a second implementation and is similar to FIG. 4 with the exception of the optimizer device 300. In FIG. 5, the optimizer device 300 consists of three servers, instead of one. Moreover, these three servers may be connected to each other, for example in a Local Area Network (LAN). More servers assist in load balancing and keep customers from getting frustrated. The web server component 310 and the processing component 320 may run on Server 1 and the other components of the optimizer device 300, such as the customer database 330, commodity database 340, optimization database 350, decision rules database 360, and the processing component 320 may run on Servers 2 or 3. Depending on the amount of traffic to the web site, more servers may be added if needed. The present invention is not limited to the above examples. Other implementation configurations will be known to those skilled in the art, and are within the scope of the present invention.

The operation of the system will be described now with reference to FIGS. 6–10B. In step 805 of FIG. 6, the customer uses the customer device 100 to visit the web site hosted by the web server component 310. For example, the customer may use the browser 110, such as Netscape Navigator, to visit the web site. When a business customer visits the web site, he is preferably presented with the choice of building a customer profile, or going directly to the optimization process. If the customer is a new user to the system, the customer is asked to enter personal information, such as name, address, e-mail address, and a password for future visits to the site, as indicated by step 817. Once the customer provides this information, the system creates an account for the customer. Alternatively, if the customer already has an account with the system, the system asks the customer for a user name and password at step 819. The account information may be stored in the customer database 330. Other customer authentication schemes known to those skilled in the art may be used and are within the scope of the present invention.

Figure 10A:
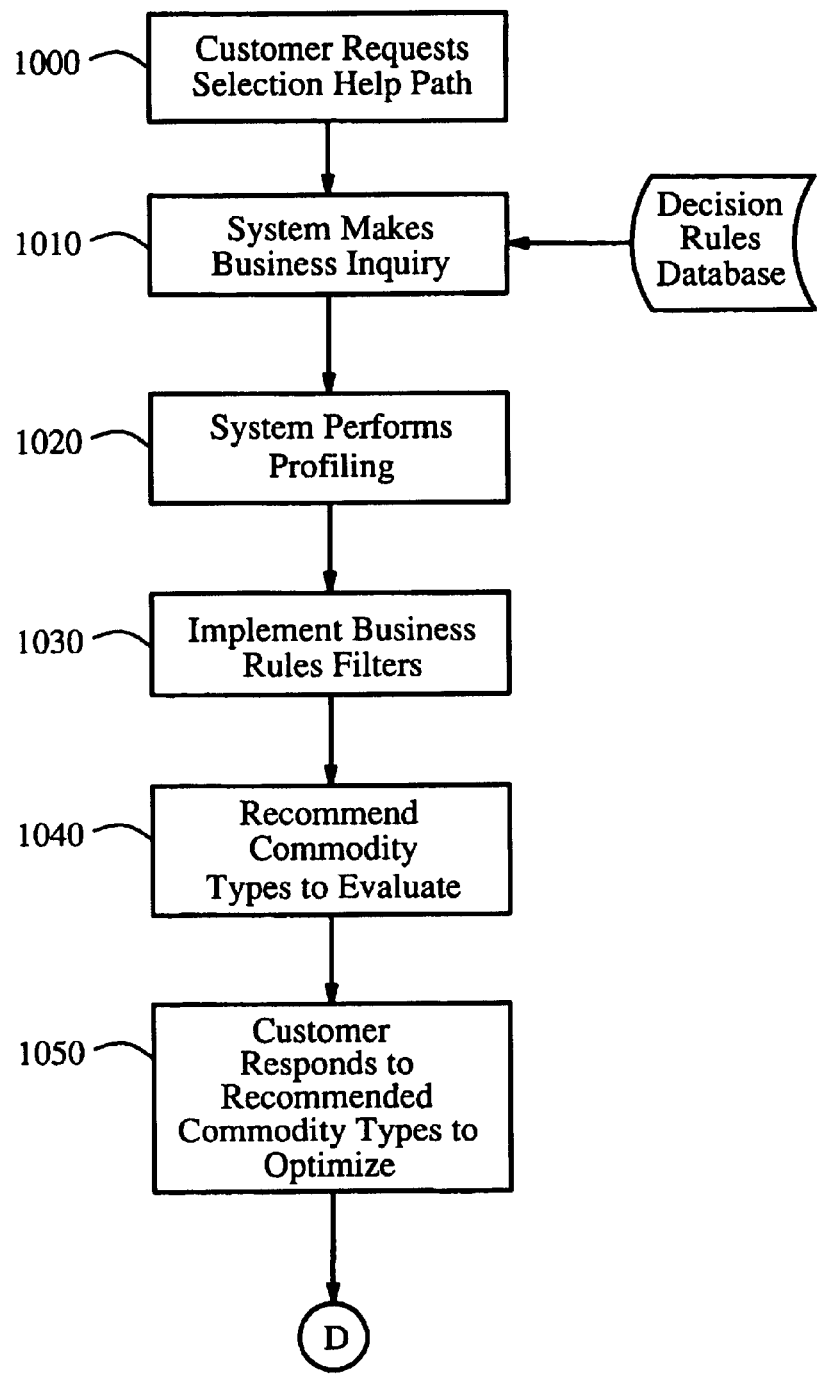
FIGS. 10A–B are flow charts depicting the business profile process of the present invention.
Figure 10B:
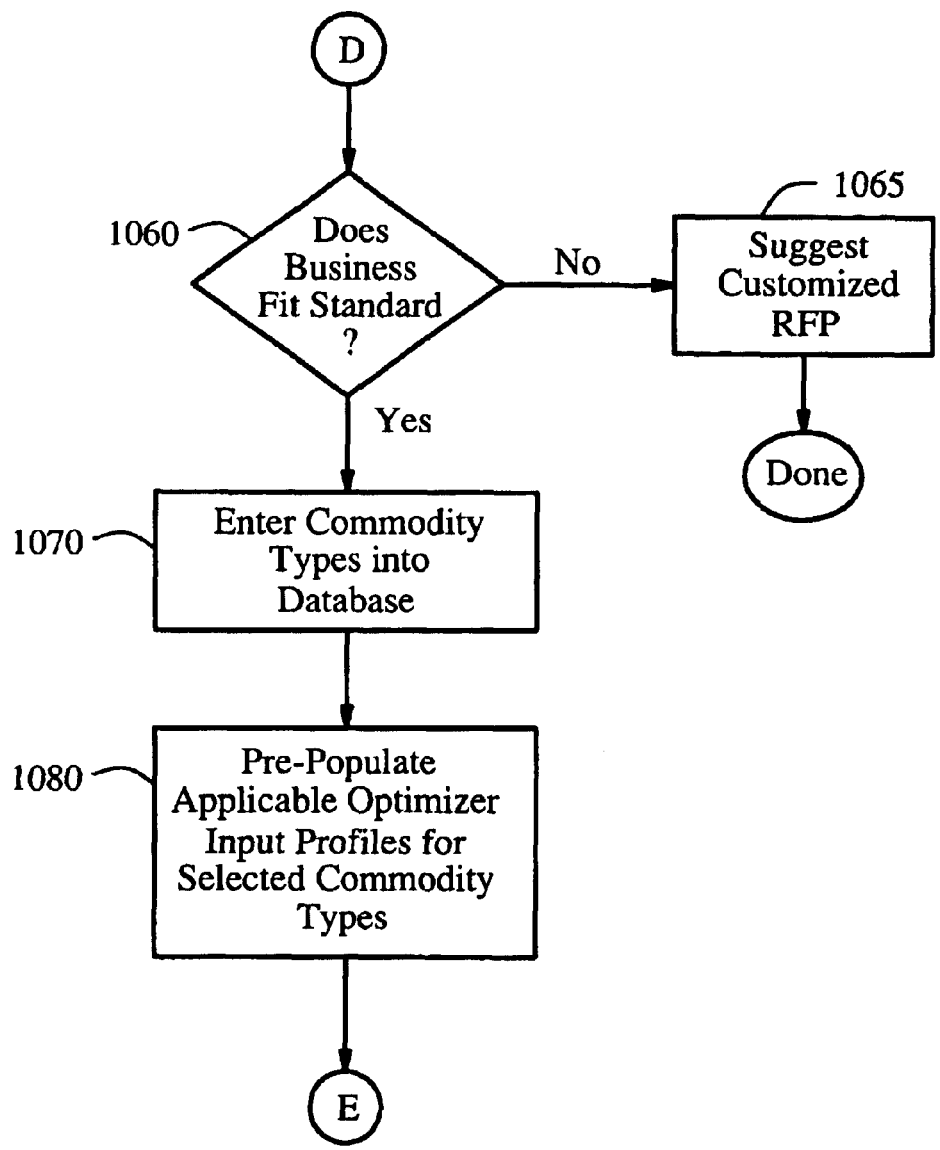

Once the customer is authenticated, the system inquires if the customer wishes to build a business profile or begin the optimization process with known categories. This is shown in step 822. As may be typical with a start-up company, or a company using the inventive system for the first time, the customer may be unsure of its business requirements. For example, the customer may not actually know what commodities it needs, their preferences for attributes of any commodities, or how to weigh what preferences it may have. In this situation, the customer will use the inventive system to build a business profile that will enable the system to identify which products and services the customer needs and ultimately optimize them. In a preferred embodiment of the present invention, as shown in FIGS. 10A–B, the customer requests the system to build a business profile, at step 1000. The system proceeds to ask the customer a series of questions that will establish a general profile of the business. For example, the customer is asked its type of business in step 1010. Based upon the answer (such as the business is retail, manufacturing, financial services, etc.), the system will search the decision rules database 360 and present a series of follow-up questions about the business.

In step 1020 the system performs profiling by asking the customer a number of questions regarding the business. For example, the customer is asked for its business main location and any other locations that it may have, the number of employees the business has and a projected growth rate of employees, how many employees will require a computer and what type of processing will be needed (such as Internet access, e-mail, word processing, remote access), how many telephones will be needed and what type of service (such as wireless phones, pagers, etc.). The system also will ask the customer what type of existing network it has (if any). This line of questioning will inquire as to information about the routers, servers, hubs, bridges, modem, firewalls, virus software, etc. The system also will ask the customer about its existing Internet connection, such as whether the connection is a dial-up, ISDN, DSL, cable modem, etc. The customer's existing in-building wiring is determined, as is the existing contracts the customer has with telephone companies, Internet access companies, pagers, etc. The present invention also will ask the customer what type of network security already exists, and what type of security it desires in the future. Related to this question is how critical the security issue is to the customer.

The questions presented to the customer are based on a decision tree that will change depending on how the customer answers each question. The inventive system uses a human-like interaction using fuzzy logic. Fuzzy logic is the ability for computers to make a complex association by using "inference engines" or a knowledge database to build up the associations and make the appropriate connection/decision. For example, if a business is a sales office with three employees, it will not be prompted for the same level of security options as is provided to an e-business. Similarly, a delivery service, such as a flower shop, will be directed towards specific 1-800 plans for telephone plans needs. On the other hand, an engineering consulting business will need a telephone plan that enables it to make calls on direct lines only. The present invention is not limited to the above examples of areas of inquiry. Other information and inquiries will be known to those skilled in the art, and are within the scope of the present invention.

Once the customer answers all the questions presented by the system, the profiling information is stored in decision rules database 360. Then design rules are applied to the information stored in decision rules database 360 (step 1030). The inventive system will determine areas in which the customer will be able to optimize service, and presents these areas to the customer at step 1040.

The customer can deselect or select additional categories at step 1050. A suggested profile for each category is presented to the customer and can be modified by the customer. Once the customer is satisfied that all categories have been addressed, the system determines if the business fits a standard solution set, at step 1060. If the business is outside the standard solution set, the inventive system will suggest that a customized RFP be created, at step 1065. If the business fits a standard solution set, the requirements for each category are entered into the customer database 330 at step 1070, and an optimization routine is run for each category.

For example, a start-up e-commerce business selects an office location, has 6 employees and no existing infrastructure. Based upon the questions presented by the decision tree of the inventive system, the general profile of the customer's business is:

a. Type of Business—E-Commerce
b. Main Location—111 Smith Road, Jonesboro, Pa., 19999
c. Other Locations—none
d. Number of Employees—6 employees
e. Projected Employee Growth Rate/Year—150% growth
f. Number of Employees require:
  i. 6 PCs
  ii. 4 Phones
  iii. 6 internet access
  iv. 6 word processing
  v. 6 email
  vi. 4 excel
  vii. 6 file sharing
  viii. 3 mobile computing
  ix. 3 remote access
  x. 3 wireless phones
  xi. 2 pagers
g. Existing Network/Software—no existing network gear
h. Existing Internet Connection—no existing internet access
i. Existing In-Building Wiring—Cat 4 in-building wiring
j. Level of Network Security Required—Security is very critical
k. Existing Contracts—No existing contracts Based on the general profile of the customer, the design rules of the present invention determine the following:

1) The business has 6 employees and expects 150% growth, the solution must be sized for at least 15 employees within 1 year
2) 4 phone lines (even with 150% growth) is under the 12–15 line limit where a phone system is beneficial. The business should be evaluating individual calling plans
3) The customer is an E-commerce company and therefore requires development, staging, and production web servers.
4) 3 people needing remote access and security listed as very critical is not enough to justify an insourced Virtual Private Network ("VPN") solution. So an outsourced managed VPN solution could be used.

5) Also, a firewall will be needed for the network access point since security is very critical.
6) With 6 people requiring internet access+150% growth+ an E-Commerce company that will require additional access to load/update its site, the customer will need at least 256K–512K of access bandwidth given at least a 1 year contract will be required. (This can be driven by a look-up table or assuming 28K per user on average).
7) The wireless and paging users justify a high volume business discount. However, a shared minute plan in wireless may make sense.

Given the above conclusions about the customer, the categories to optimize, suggested by the system, are Internet access, phone service, PCs, servers, VPNs, firewalls, wireless, and paging.

The business requirement information and business rules can be used to pre-populate the optimizer input profiles at step 1080. For example, knowing how many employees the business has, the number of shared wireless users can be pre-selected in the wireless optimizer input profiles as a convenience to the user. The business rules are stored in the business rules database and can be updated as additional solution sets become known for given business types and new technologies become available in product and service categories of interest.

Going back to FIG. 6, the optimization routine will now be described. The optimization routine can be used when the system determines categories for the customer, as described above, and when the customer directly inputs desired categories. A customer may input categories as follows. The customer is presented with a set of questions relating to the commodity category that was selected by the customer in step 810. In particular, the system asks for the customer's hard requirements, preferences, and preference weightings. Hard requirements may include requirements that the customer absolutely needs in a commodity and/or geographic area information. For example, if the customer is shopping for a four-wheel drive vehicle, the customer may indicate that as a hard requirement. Preferences may include the customer's preferences about certain features of the commodity. Preference weightings may be the relative importance of these preferences against each other. For example, if the customer is shopping for a new ISP plan, the system may request the name and plan information of the customer's current service provider and a current estimated monthly bill. The system may also ask the customer to rate the current service provider. This rating may be used to calculate future quality ratings associated with an ISP. The system may also request the customer's estimated approximate usage per month, the current connection speed (CSref), the desired number of e-mail accounts (EMref), the desired amount of disk storage space (DSref), and the desired contract length (CLref). The system may also ask the customer for preference weightings for connection speed, disk storage space, number of e-mail accounts, quality, and price. Furthermore, the customer may be asked to weigh the importance in percentages. In an alternative embodiment, the customer may be forced to assign percentages so that the percentages add to a hundred percent. For example, a customer may enter his importance ratings as connection speed (30%), disk space (10%), number of e-mail accounts (10%), quality (20%) and price (30%). Additionally, the customer may choose to make connection speed, disk storage space, number of e-mail accounts, quality, and/or price hard requirements. The geographic area is an automatic hard requirement in the case of an ISP because some ISPs only provide service in certain areas.

In an alternative embodiment, some of the required information, such as geographic location or preference information may be retrieved from the customer database 330. This retrieved information may be the information that the customer provided to the system during previous visits or during the account creation step. Moreover, the customer may be presented with this retrieved information and may be given the choice to amend this information rather than having to enter everything again.

Figure 6:
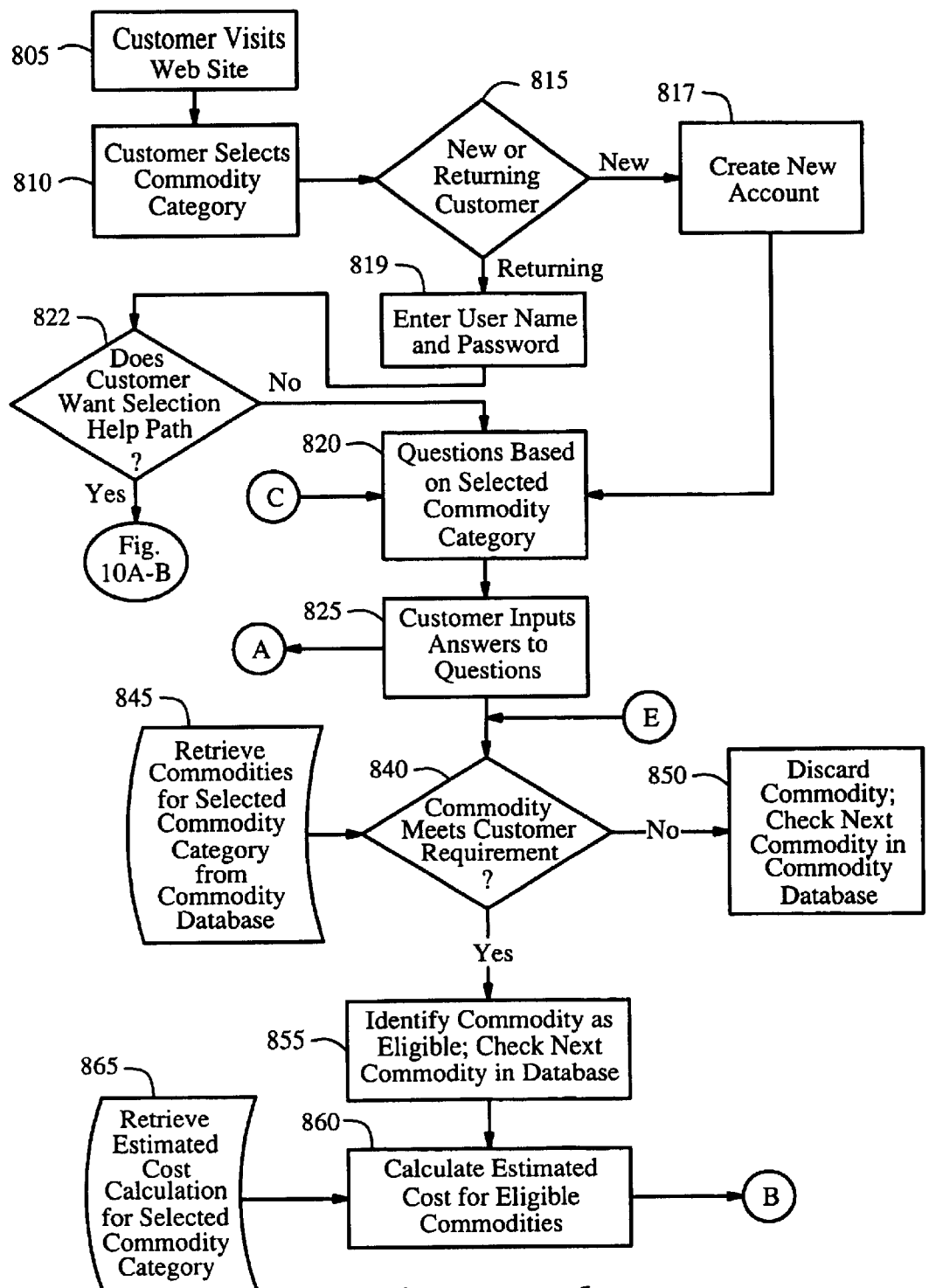
FIG. 6 is a flow chart depicting one embodiment of an operation of the present invention.
Figure 7:
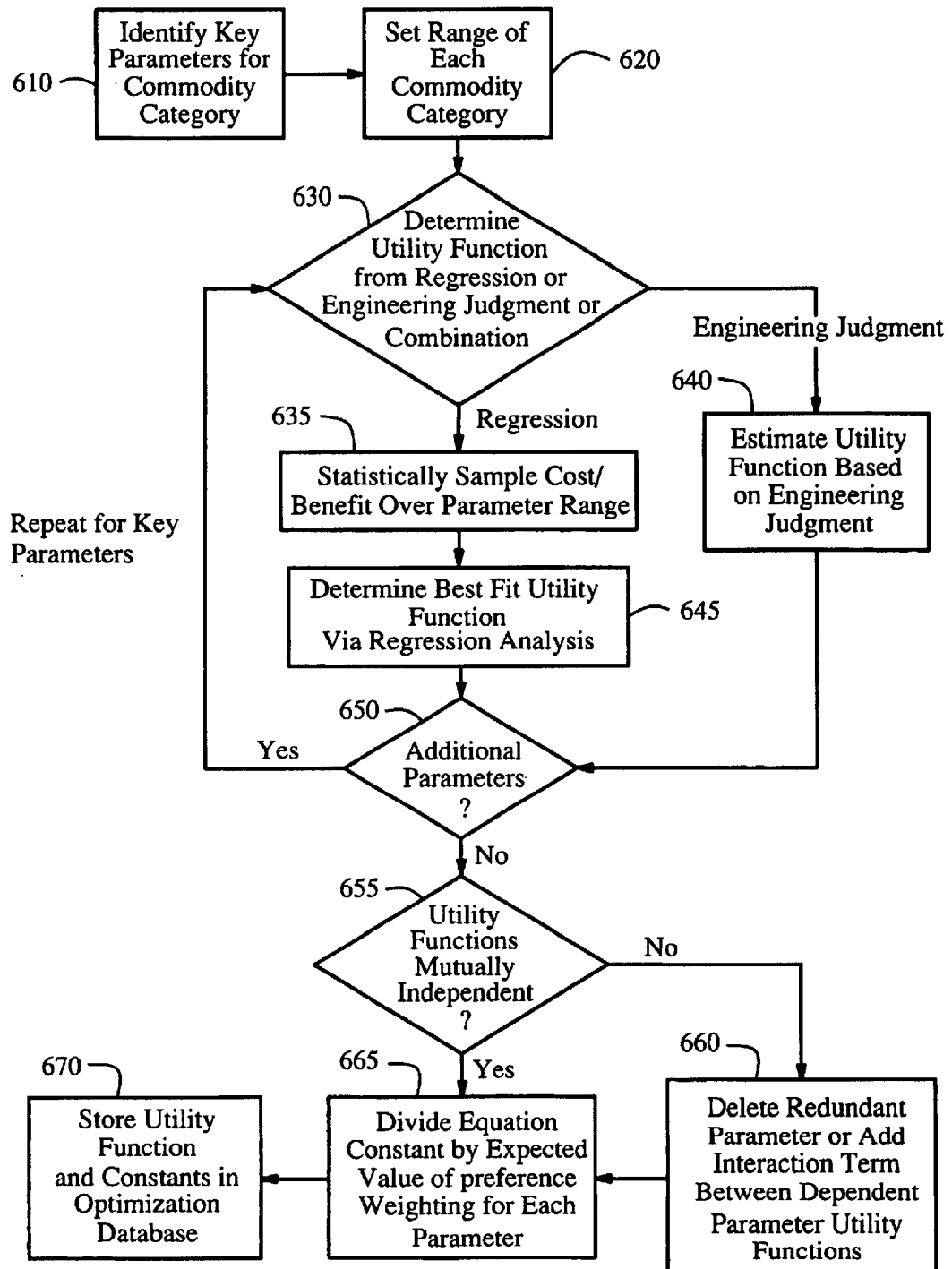
FIG. 7 is a flow chart depicting the process of deriving the utility functions of the present invention.

As shown in steps 840, 845, 850, and 855 of FIG. 6, the system queries the commodity database to find the eligible commodities that meet the customer's hard requirements that were entered in step 825 or were determined by the business profile system, shown in FIGS. 10A–B. For example, if a customer shopping for an ISP plan has a hard requirement of at least two e-mail accounts, only ISP plans serving the customer's geographic area and providing at least two email accounts are considered by the system to be "eligible". Geographic area can be determined through Zip codes, area codes and exchanges, or any other method known to those skilled in the art. If a particular commodity does not match the hard requirements, the commodity is discarded as a choice for the customer. Alternatively, if a particular commodity meets the customer's hard requirements, the system identifies the commodity as eligible.

As an example, consider a customer located in the 610 area code and 644 exchange area shopping for a new ISP plan. This customer requires that the ISP plan provide him with at least two e-mail accounts. Table 1 illustrates sample data from the commodity database before the query is executed. After executing the query, the optimizer will discard Plan 1, even though it is eligible geographically, because it does not offer at least two e-mail accounts. Plan 4 is discarded because it is not in the customer's geographic area. The shaded columns in Table 2 illustrate that these choices are ineligible.

TABLE 1

| ISP Option | Plan 1 | Plan 2 | Plan 3 | Plan 4 | Plan 5 |
|---|---|---|---|---|---|
| 1. Area Code + Exchange | 610–644 | 610–644 | 610–644 | 202–467 | 610–644 |
| 2. Monthly Cost | 9.95 | 19.95 | 39.99 | 34.99 | 45.99 |
| Usage Cost (Per hr) | 0.50 | 0 | 0 | 0 | 0 |
| 3. Equipment Cost | 0 | 0 | 120.00 | 59.00 | 79.99 |
| Connection Speed | 56 | 56 | 1000 | 1500 | 128 |
| Disk Space | 3 | 1 | 5 | 4 | 6 |
| EMAIL Accounts | 1 | 2 | 4 | 2 | 3 |
| Quality Rating | 2 | 4 | 3 | 4 | 5 |
| Contract Length | 0 | 0 | 6 | 12 | 6 |
| Termination Fee | 0 | 0 | 20.00 | 40.00 | 50.00 |

TABLE 2

| ISP Option | Plan 1 | Plan 2 | Plan 3 | Plan 4 | Plan 5 |
|---|---|---|---|---|---|
| 4. Area Code + Exchange | 610–644 | 610–644 | 610–644 | 202–467 | 610–644 |
| 5. Monthly Cost | 9.95 | 19.95 | 39.99 | 34.99 | 45.99 |
| Usage Cost (Per hr) | 0.50 | 0 | 0 | 0 | 0 |
| 6. Equipment Cost | 0 | 0 | 120.00 | 59.00 | 79.99 |
| Connection Speed | 56 | 56 | 1000 | 1500 | 128 |
| Disk Space | 3 | 1 | 5 | 4 | 6 |
| EMAIL Accounts | 1 | 2 | 4 | 3 | 3 |
| Quality Rating | 2 | 4 | 3 | 4 | 5 |
| Contract Length | 0 | 0 | 6 | 12 | 6 |
| Termination Fee | 0 | 0 | 20.00 | 40.00 | 50.00 |

Next, in steps 860 and 865, the system retrieves the estimated cost equations from the optimization database 350 and calculates the estimated costs for all the eligible commodities. For example, in the case of the ISP plans, the effective cost calculation may be expressed in terms of the estimated monthly cost (EMC):

$$EMC = Monthly\ cost + Usage\ Cost * Estimated\ Usage.$$

In the equation above, the Monthly cost is the recurring monthly charge in dollars associated with a particular ISP plan; Usage Cost is the cost per time of use in dollars per hour, and Estimated Usage is the customer's estimate of the amount of time that will be spent using an ISP's services during a month.

For the three eligible plans listed in Table 2, the EMC can be calculated by using the estimated usage information that the customer entered in step 825 or was determined in step 1070 of the business profile method and by using the monthly cost and usage cost that were retrieved from the commodity database in step 865. Assuming that the customer entered 30 hours/month in step 825, the EMCs for the eligible plans listed in Table 2 are:

EMC (plan2)=$19.95

EMC (plan3)=$39.99

EMC (plan5)=$45.99

Next, the estimated cost is adjusted by the utility functions and other cost equations stored in the optimization database 350. The process of calculating the utility functions and associated constants will be described now with reference to FIG. 7. The process begins with the identification of the key parameters associated with a commodity category, as shown in step 610. These key parameters are parameters that affect the customer's decision about a commodity and may include features, performance, or quality characteristics of a particular commodity. For example, in the case of an ISP plan, the key parameters are connection speed; disk space (which the customer, for example, may use for a web site); the quality of the connection; number of e-mail accounts; and the contract length and the termination fee associated with such a plan. These parameters may be identified based on engineering judgment or may be based on a survey of random customers.

Next, in step 620, the range for each parameter is identified. For example, in the case of connection speed of an ISP plan, the range may be from less than 33 Kpbs to 1500 Kpbs. Once the ranges are identified, the utility functions may be calculated by using regression analysis, engineering judgment, or a combination of both, as shown in steps 630, 635, 640, 645, and 650. If regression analysis is used, a random set of customers may be sampled to obtain a quantitative value, usually a dollar value, associated with that particular parameter, as shown in step 635. For example, in the case of an ISP plan, a survey like the one shown in FIG. 8 may be sent to ISP customers. The dollar values may be then used to calculate a best-fit utility function via regression analysis, as shown in step 645. Alternatively, the utility function may be calculated using engineering judgment, or a combination of regression analysis and engineering judgment, as shown in step 640. For example, engineering judgment may be used to adjust the utility function obtained through regression analysis. If needed, steps 630, 635, 640, and 645 may be repeated to calculate the utility functions for all of the key parameters associated with each commodity, as shown in step 650. The utility functions may be calculated for a generalized sample group or for specific sample groups based on demographics, for example age, income, household size, and spending. Moreover, the spending may be based on the estimated costs.

For example, in the case of an ISP plan, there may be five key parameters as identified above, and thus, five utility functions. These five utility functions are:

a. $U(\text{connection speed}) = K_{cs} * P_{cs} * \ln(CS/CS_{ref})$ b. $U(\text{disk space}) = K_{ds} * P_{ds} * \ln(DS/DS_{ref})$ c. $U(\text{quality}) = K_q * P_q * \ln(Q/Q_{ref})$ d. $U(\text{email}) = K_{em} * P_{em} * \ln(EM/EM_{ref})$ e. $U(\text{termination fee/contract length}) = K_{tf} * TF * (CL - CL_{ref})/CL$ if $CL > CL_{ref}$, otherwise$=0$ In these five utility functions, $K_{cs}$, $K_{ds}$, $K_q$, $K_{em}$, and $K_{tf}$ are constants that will be described in step 665; $P_{cs}$, $P_{ds}$, $P_q$, and $P_{em}$ represent the preference weightings and will be described in step 665; CS, DS, Q, EM, and CL represent connection speed, disk space, quality, email, and termination fee, respectively, for a specific Internet Service Provider plan and are stored in the commodity database 340; $CS_{ref}$, $DS_{ref}$, $Q_{ref}$, $EM_{ref}$, and $CL_{ref}$ represent the values entered by the customer in step 825, or predefined, for example as average values (such as QRef). These values entered by the customer may be used to normalize the parameters, as shown in the utility functions above.

In step 655, an independence check is done on each utility function versus the other utility functions for a given commodity using correlation, which may include regressing against the other utility functions. If correlation is present, the redundant utility term is either omitted from the equation or an interaction term of the form $K_3 * U_1(x) * U_2(x)$ is added to account for the relationship, as shown in step 660. After the independence check is completed, the constants for each utility function for which the customer provides a preference weighting, such as $K_{cs}$, $K_{ds}$, $K_q$, and $K_{em}$, are calculated by dividing the original regression constants by the expected value of the preference weighting range, as shown in step 665. For example, in the case of an ISP plan, the original regression constants were 7.6 for connection speed, 0.9 for disk space, 3.64 for quality, 2.2 for e-mail, and 2.43 for termination fee/contract length. Moreover, the customer is asked to provide a preference weighting over a weighting range of zero to hundred for five parameters: price, quality, connection speed, disk space, and number of e-mail accounts. Thus, given equal importance of all parameters, the expected value of the preference weighting for each parameter is twenty. Accordingly, the constants, Kcs, Kds, Kq, and Kem, are calculated by dividing the original regression constants by twenty. Ktf is not adjusted since the customer does not input a preference weighting for the termination fee. Instead, the customer inputs the acceptable value of the contract length in months, which is used as the reference contract length, CLref. Accordingly, in the ISP case, the constants are: Kcs=0.38, Kds=0.045, Kq=0.182, Kem=0.11, and Ktf=2.43.

Finally, the utility functions, along with the constants and the sample data used for regression analysis, are stored in the optimization database 350, as shown in step 670. Other methods of calculating utility functions will be known to those skilled in the art and are within the scope of the present invention.

Figure 9:
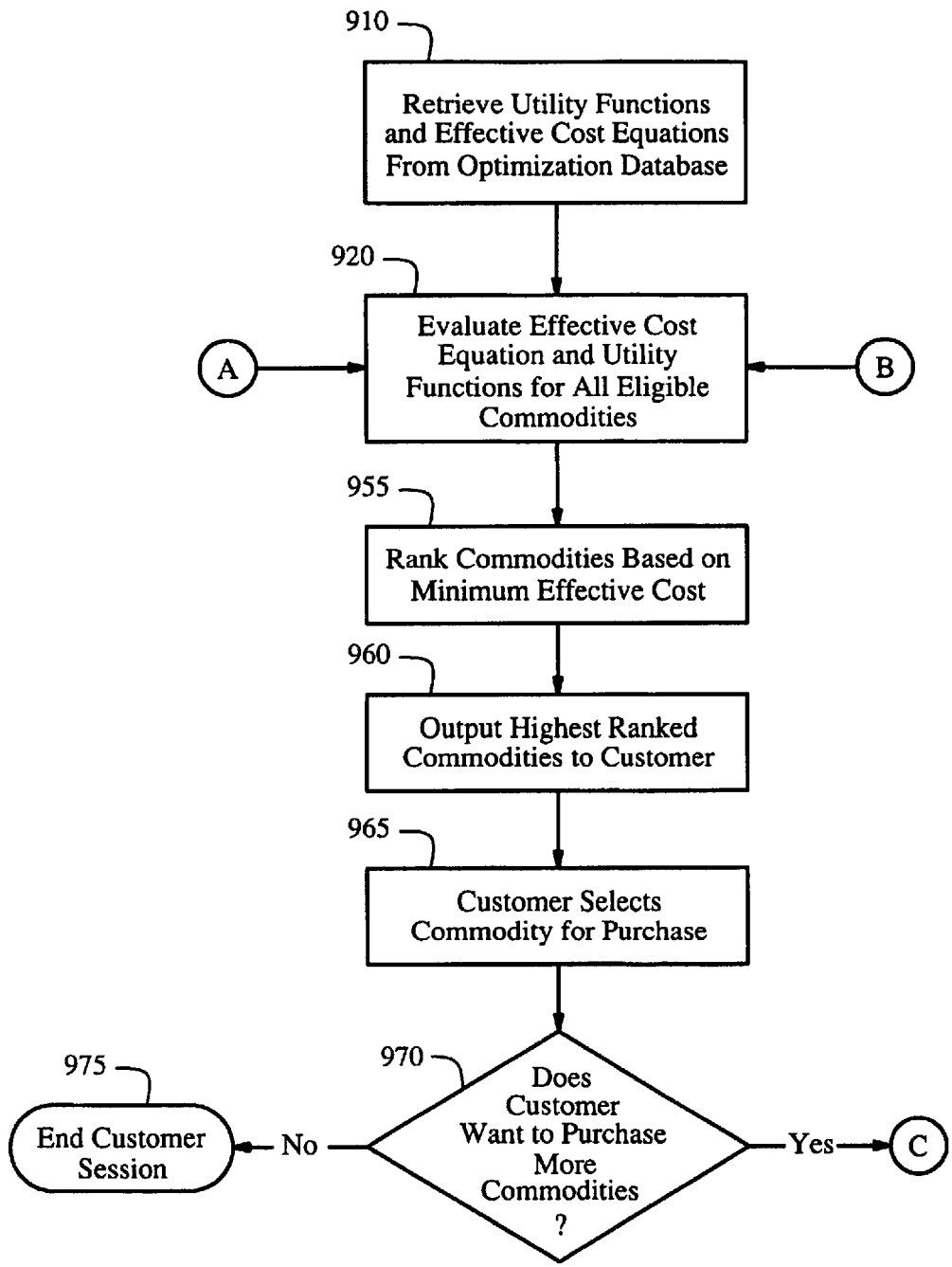
FIG. 9 is a flow chart depicting an adjustment process of the present invention.

As mentioned in the foregoing description, the estimated cost calculated in step 860 is adjusted by the values obtained from evaluating the utility functions that relate to the commodity that the customer desires to purchase. The value is subtracted from the estimated cost if it represents a benefit to the customer. On the other hand, the value is added to the estimated cost if it represents a cost or burden to the customer. FIG. 9 will be used to describe this adjustment process. In step 910, the utility functions and effective cost equations are retrieved from the optimization database 350. These equations are evaluated based on the customer inputs as indicated by branch A in step 920. For example, in the case of the ISP plan, the utility functions, U(connection speed), U(disk space), U(quality), U(email), and U(termination fee), are evaluated. The resulting utility function values and other related costs are added or subtracted from the estimated cost to get the effective cost. The effective cost equations, in most cases, represent the sum of the utility function values, estimated costs, and any other costs, such as amortized fixed costs. For example, the effective cost equation for an ISP is:

Effective Cost=$EMC$+Amortized fixed Costs−$U$(connection speed)−$U$(disk space)−$U$(quality)−$U$(email)+$U$(termination fee).

The Amortized fixed costs are equal to (Activation Fee+ Equipment Cost)/Contract Length (CL Ref). The amortized fixed costs and the value of the termination fee utility function are added to the Effective Cost because these represent a cost or burden to the customer, and the others are subtracted from the Effective Cost because they represent a benefit to the customer. Using the above equation, the effective costs for the eligible commodities are Plan 2 is $18.6, Plan 3 is $32.5, and Plan 5 is $48.4.

Once the effective cost is calculated, the commodities are ranked based on minimum effective cost, as indicated by step 955. The highest ranked commodities are presented to the customer, as indicated by step 960. For example, Plan 2 will be the highest ranked plan in the ISP case. Next, the customer selects the commodity that the customer wants to purchase and the system processes the request, as indicated by step 965. Now, the customer has the option of either ending the session, such as by exiting the browser, or can repeat this process for another commodity category, as indicated by steps 970, 975, and branch C.

Although the present invention was described with an example of an ISP plan, the present invention is not limited for use with an ISP. A person skilled in the art will know how to modify the present invention for use with other products and/or services.

The present invention assists both customers and vendors. Customers obtain the commodity that best meets their personal preferences, while the vendors educate customers about their commodities. Moreover, customers who use the system of the present invention to select a vendor are likely to stay with this vendor because the commodity selection and thus, the vendor selection, is based on the customer's preferences.

While the invention has been described in detail and with reference to specific embodiments thereof, it will be apparent to one skilled in the art that various changes and modifications can be made therein without departing from the spirit or scope thereof. Thus, it is intended that the present invention covers the modifications and variations of this invention provided they come within the scope of the appended claims and their equivalents.

What is claimed is:

1. A computer-implemented method for assisting a customer in choosing among commodities comprising the steps of:

asking the customer for a definition of its business;

searching a decision rules database and applying decision rules to the business definition;

creating a set of business requirement questions based upon the applied decision rules database;

receiving answers to the set of business requirement questions by the customer;

modifying the set of business requirement questions based on the answer received for each question;

implementing a business rule filter to the answers of the set of business requirement questions; and recommending to the customer commodity types based upon the business rule implementation, wherein recommending further comprises:

allowing the customer to de-select at least one of the recommended commodity types;

allowing the customer to request non-recommended commodity types; and entering the at least one of the recommended commodity types and the requested non-recommended commodity types into an optimizer device for determining optimum commodity selections for each of the recommended and requested non-recommended commodity types for use by the customer.

2. The computer-implemented method of claim 1, further comprising the steps of:

selecting, by the customer, at least one of the recommended commodity types.

3. The computer-implemented method of claim 2, further comprising the steps of:

identifying at least one first parameter associated with the at least one selected commodity type;

associating at least one value to the at least one first parameter;

calculating an estimated cost of the at least one selected commodity type based on features of the commodity that are desired by the customer;

obtaining from the customer a preference weighting on at least one second parameter;

calculating an effective cost by adjusting the estimated cost based on the preference weighting and the at least one value assigned to the parameters; and presenting a subset of commodities to the customer including the at least one selected commodity, wherein the commodity is selected based on at least a lowest effective cost.

4. The computer-implemented method of claim 1 wherein business requirement questions are generated through fuzzy logic interactively by the business rules and customer answers to the business requirement questions.

5. The computer-implemented method of claim 1, wherein the set of business requirement questions
includes questions regarding number of employees, expected employee growth rate, whether and how many computers are needed, what type of computer processing is needed, how many telephones and what type of telephone services are needed, if the business has an existing network and what type of network, if the customer has an existing Internet connection and what type of connection, the customer's existing building plans, and what type of network security exists and is needed for the future.

6. The computer-implemented method of claim 1 further comprising the step of determining whether to optimize the recommended commodity types or create requirements for the customer to use in solicitation of bids through a Request for Proposal process for the commodity type.

7. A system for assisting a customer in choosing between commodity types, comprising:
an optimizer device that is connected to a network, wherein the optimizer device includes
at least one database that includes information about at least one commodity type, at least one utility function, and at least one business profile for the customer, and
a processing component enabled to perform tasks including:
receiving answers to a set of business requirement questions,
modifying the set of business requirement questions based on the answers, and
recommending to the customer a list of commodity types including at least one commodity type based on the business profile for the customer and the utility function for the commodity type, the recommending to the customer further comprising:
allowing the customer to de-select at least one of the recommended commodity types;
allowing the customer to request non-recommended commodity types; and
entering the at least one of the recommended commodity types and the requested non-recommended commodity types into an optimizer device for determining optimum commodity selections for each of the recommended and requested non-recommended commodity types for use by the customer; and
a customer device for connecting to the optimizer device via the network and sending business requirement information to the optimizer device.

8. The system of claim 7, wherein the optimizer device includes a web server component for hosting a web site and the customer uses the customer device to visit the web site.

9. The system of claim 7, wherein the utility function is associated with a parameter of the commodity type and is evaluated to obtain the at least one value, wherein the value represents a cost or benefit of the parameter to the customer.

10. The system of claim 7 wherein in selecting the best commodity for the customer the system considers multiple quantities of a product, including volume discounts.

11. The system of claim 7, wherein the business profile of the customer includes information regarding location of the business, number of employees, expected employee growth rate, whether and how many computers are needed, what type of computer processing is needed, how many telephones and what type of telephone services are needed, if the business has an existing network and what type of network, if the customer has an existing Internet connection and what type of connection, the customer's existing building plans, and what type of network security exists and is needed for the future.

12. A computer system for assisting a customer in choosing among commodities comprising:
means for asking the customer for a definition of its business;
means for searching a decision rules database and applying decision rules to the business definition;
means for creating a set of business requirement questions based on a decision tree that is configured to change in response to the applied decision rules;
means for receiving answers to the set of business requirement questions by the customer;
means for modifying the set of business requirement questions based on the answer received to each question;
means for implementing a business rule filter to the answers of the set of business requirement questions; and
means for recommending to the customer commodity types based upon the business rule implementation, wherein the means for recommending further comprising:
a means for allowing the customer to de-select at least one of the recommended commodity types;
a means for allowing the customer to request non-recommended commodity types; and
a means for entering the at least one of the recommended commodity types and the requested non-recommended commodity types into an optimizer device for determining optimum commodity selections for each of the recommended and requested non-recommended commodity types for use by the customer.

13. The computer system of claim 12, further comprising:
means for selecting, by the customer, at least one of the recommended commodity types; and
means for presenting the customer with a subset of commodities including the at least one optimum commodity.

14. The computer system of claim 13, further comprising:
means for identifying at least one first parameter associated with the at least one selected commodity type;
means for associating at least one value to the at least one first parameter;
means for calculating an estimated cost of the at least one selected commodity based on features of the commodity type that are desired by the customer;
means for obtaining from the customer a preference weighting on at least one second parameter;
means for calculating an effective cost by adjusting the estimated cost based on the preference weighting and the at least one value assigned to the parameters; and
means for presenting a subset of commodities to the customer including at least one selected commodity type, wherein the commodity type is selected based on at least a lowest effective cost.

15. The computer system of claim 12, wherein the set of business requirement questions includes questions regarding number of employees, expected employee growth rate, whether and how many computers are needed, what type of computer processing is needed, how many telephones and what type of telephone services are needed, if the business has an existing network and what type of network, if the customer has an existing Internet connection and what type of connection, the customer's existing building plans, and what type of network security exists and is needed for the future.

16. The computer system of claim 12, wherein the means for asking the customer for business definition, means for analyzing the set of business requirements information, and means for recommending to the customer commodity types is implemented on a web server interacting with the customer through a website.

17. A computer readable medium having computer executable instructions for performing actions for assisting a customer in choosing from available commodities, the actions comprising:

determining a customer's definition of its business;

creating a set of business requirement questions;

receiving responses to the set of business requirement questions;

dynamically modifying the questions based on received responses by employing an inference engine;

implementing a business rule filter based on the responses of the set of business requirement questions to determine an optimum commodity selection; and recommending the customer with a subset of commodities including the at least one optimum commodity, wherein recommending further comprises:
  allowing the customer to de-select at least one of the recommended commodity types;
  allowing the customer to request non-recommended commodity types; and
  entering the at least one of the recommended commodity types and the requested non-recommended commodity types into an optimizer device for determining optimum commodity selections for each of the recommended and requested non-recommended commodity types for use by the customer.

18. The computer readable medium of claim 17, wherein the presented optimum commodity selection is determined based on lowest effective cost.

19. Computer readable medium of claim 17, wherein the business profile of the customer includes information regarding location of the business, number of employees, expected employee growth rate, whether and how many computers are needed, what type of computer processing is needed, how many telephones and what type of telephone services are needed, if the business has an existing network and what type of network, if the customer has an existing Internet connection and what type of connection, the customer's existing building plans, and what type of network security exists and is needed for the future.

20. A computer-implemented method for assisting a customer ill choosing among commodities, the computer-implemented method comprising the steps of:

retrieving a set of decision rules from a decision rules database;

dynamically modifying the decision rules through an interactive process based on received responses;

implementing a business rule filter to available commodities based on the modified decision rules; and recommending to the customer a subset of commodities including the at least one optimum commodity, wherein the commodity is selected based on the business rule implementation, recommending to the customer further comprises the steps of:
  allowing the customer to de-select at least one of the recommended commodity types;
  allowing the customer to request non-recommended commodity types; and
  entering the at least one of the recommended commodity types and the requested non-recommended commodity types into an optimizer device for determining optimum commodity selections for each of the recommended and requested non-recommended commodity types for use by the customer.

21. The computer-implemented method of claim 20, wherein the decision rules are initially determined by application of utility functions and optimization equations stored in an optimization database to a business profile.

22. The computer-implemented method of claim 20, wherein the dynamic modification of the decision rules employs fuzzy logic based on received responses.

23. The computer-implemented method of claim 20, wherein the business rule implementation further includes estimated cost and bundling discounts.

* * * * *